US007461791B2

(12) United States Patent
Keshura

(10) Patent No.: US 7,461,791 B2
(45) Date of Patent: Dec. 9, 2008

(54) METHOD AND APPARATUS FOR FORMING ISO-COMPLIANT TRANSACTION CARDS INCLUDING PLA

(75) Inventor: Robert Alan Keshura, Somerset, MA (US)

(73) Assignee: Arthur Blank & Company, Inc., Boston, MA (US)

( * ) Notice: Subject to any disclaimer, the term of this patent is extended or adjusted under 35 U.S.C. 154(b) by 237 days.

(21) Appl. No.: 11/347,090

(22) Filed: Feb. 3, 2006

(65) Prior Publication Data

US 2007/0181696 A1 Aug. 9, 2007

(51) Int. Cl.
*G06K 19/02* (2006.01)

(52) U.S. Cl. ....................... 235/488; 235/380; 235/487; 235/492

(58) Field of Classification Search ................. 235/488, 235/380, 487, 492, 493
See application file for complete search history.

(56) References Cited

U.S. PATENT DOCUMENTS

| | | | | |
|---|---|---|---|---|
| 5,695,589 A | | 12/1997 | German et al. | |
| 6,817,630 B1 | * | 11/2004 | Fischer et al. | 283/67 |
| 6,891,555 B2 | * | 5/2005 | Minowa et al. | 347/171 |

FOREIGN PATENT DOCUMENTS

| | | | | |
|---|---|---|---|---|
| JP | 01214487 A | | 8/1989 |
| JP | 08267968 A | | 10/1996 |
| JP | 09131835 A | | 5/1997 |
| JP | 09-188077 | | 7/1997 |
| JP | 09188077 A | * | 7/1997 |
| JP | 10157041 A | | 6/1998 |
| JP | 2000136259 A | | 5/2000 |
| JP | 2005007695 A | | 1/2005 |

OTHER PUBLICATIONS

International Search Report PCT/US2007/002921, dated Nov. 15, 2007.

ISO/IEC 10373-1, Identification cards—test methods—Part 1: General characteristics tests, 1998.

ISO/IEC 7810, Identification cards—Physical characteristics, 2003.

* cited by examiner

*Primary Examiner*—Seung H Lee
(74) *Attorney, Agent, or Firm*—Wolf, Greenfield & Sacks, P.C.

(57) ABSTRACT

A method and apparatus for forming transaction cards. A smooth glossy outer surface may be provided on transaction cards without the use of an over-laminate film. A liquid coating material may be applied to a sheet substrate, which is subsequently subjected to heat and pressure so that the liquid coating material forms a smooth outer surface that may be highly durable and abrasion resistant. Transaction cards may be made using a material that includes a substantial amount of PLA, and may be made to meet ANSI and ISO specifications for transaction cards.

25 Claims, 1 Drawing Sheet

METHOD AND APPARATUS FOR FORMING ISO-COMPLIANT TRANSACTION CARDS INCLUDING PLA

BACKGROUND

1. Field of Invention

This invention relates to methods and apparatus for forming transaction cards, such as credit cards, identification cards, gift cards, customer loyalty cards, etc., and others sheet plastic products.

2. Related Art

Transaction cards are widely used for a variety of purposes, including purchases, gift giving, ATM or other banking transactions, proof of identity, membership, loyalty or building entry access cards, and so on. High-quality transaction cards, such as those used for credit cards, are typically made by printing or otherwise forming image information on a plastic sheet substrate, e.g., to display the name of the issuer of the credit card, terms of use of the card, graphics, logos or other information. After image formation, a thin over-laminate film is applied to both sides of the sheet substrate. The films are typically made of a polyvinyl chloride (PVC), PET, PETG, polycarbonate or other polymer material, and are secured to one or both sides of the sheet substrate by subjecting the sheet and films to heat and pressure in a laminating press. This secures the films to the sheet so that the image information is sealed in and the films cannot be removed from the sheet without destroying the laminated product. The films may also add strength to the card. An adhesive may be provided as needed to enhance the bonding strength of the film to the card substrate. Once lamination processing is complete, one or more transaction cards may be cut from the sheet, e.g., using a cutting process, such as a die cut or punching process.

As will be readily appreciated, application of films to one or both sides of the sheet material increases costs, e.g., by increasing manufacturing complexity, cost of the film material, cost of adhesive material, and so on. A less expensive process for forming transaction cards involves printing desired image information on a substrate sheet as discussed above, and instead of applying an overlaminate film to one or both sides of the card, a liquid protective coating material is applied over the printed material. The coating may be applied by a roll printing process or other arrangement and is typically cured by exposure to ultraviolet (UV) light, infrared light, heat, radio frequency (RF) emissions, air, or other suitable conditions. The coating provides a reasonably effective protective layer over the printed material, thereby providing some resistance to abrasion or other damage to the card and ink or other substance forming the image information. However, the coating applied in this manner does not provide a smooth, glossy surface finish for the card, but rather gives a matte finish or eggshell-type finish. Moreover, this type of coating does not provide the same abrasion resistance as an overlaminate film.

SUMMARY OF INVENTION

Aspects of the invention provide a method for forming and a transaction card (or other product made with a sheet plastic material) that has a smooth glossy surface finish without requiring an over-laminate film to be applied to the substrate. Thus, transaction cards or other sheet-type products may be formed with a high-quality, durable surface covering without the expense or manufacturing complexity related to the use of over-laminate films. One advantage provided with one aspect of the invention is that high-quality transaction cards, including those that fully meet ISO specifications for transaction cards, may be formed at a lower cost as compared to prior manufacturing processes. In addition, such cards may have a highly-abrasion resistant outer surface without requiring the use of an over-laminate film, thereby reducing the amount of petroleum-based material in the card. When coupled with a sheet material that includes a substantial amount of polylactic acid (PLA), which may be a corn-derived or other "natural" or sugar-derived polymer, the card produced may contain a very low, or zero, amount of petroleum-based or natural gas-based material and may be more readily recycled.

In one aspect of the invention, a method for forming a transaction card includes providing a sheet of material including a substantial amount of PLA, and forming a printed image on at least a portion of one side of the sheet of material. The printed image may be suitable for use with a transaction card formed from the sheet of material. The sheet of material with the printed image may be subjected to heat and pressure suitable to enable a transaction card cut from the sheet of material to meet ISO requirements for dimensional stability regarding heat and humidity exposure. The sheet of material may include at least 80%, 90%, 95% or more PLA, which may be derived from corn, flax, beets, sugar cane, soybeans or other sugar-based source. In one embodiment, the sheet of material may be heated to a temperature of between approximately 250 degrees F. and 350 degrees F., and subjected to a pressure of approximately 150 psi in a laminating press. The heat and press operation may include a hot press cycle and a cold press cycle, where the hot press cycle includes heating and pressing the sheet of material at a temperature of between approximately 250 to 350 degrees F. and a pressure of approximately 150 psi, and the cold press cycle includes heating and pressing the sheet of material at a temperature of approximately 60 degrees F. and a pressure of approximately 300 psi.

In another aspect of the invention, a transaction card may include a sheet of material including a substantial amount of PLA, and an image printed on at least a portion of one side of the sheet of material. The sheet of material with the printed image may be subjected to heat and pressure suitable to enable the transaction card to meet ISO requirements for dimensional stability regarding heat and humidity exposure.

These and other aspects of the invention will be apparent from the following description and claims.

BRIEF DESCRIPTION OF THE DRAWINGS

Aspects of the invention are described below with reference to the following drawings in which like numerals reference like elements, and wherein.

DETAILED DESCRIPTION

Figure 1:
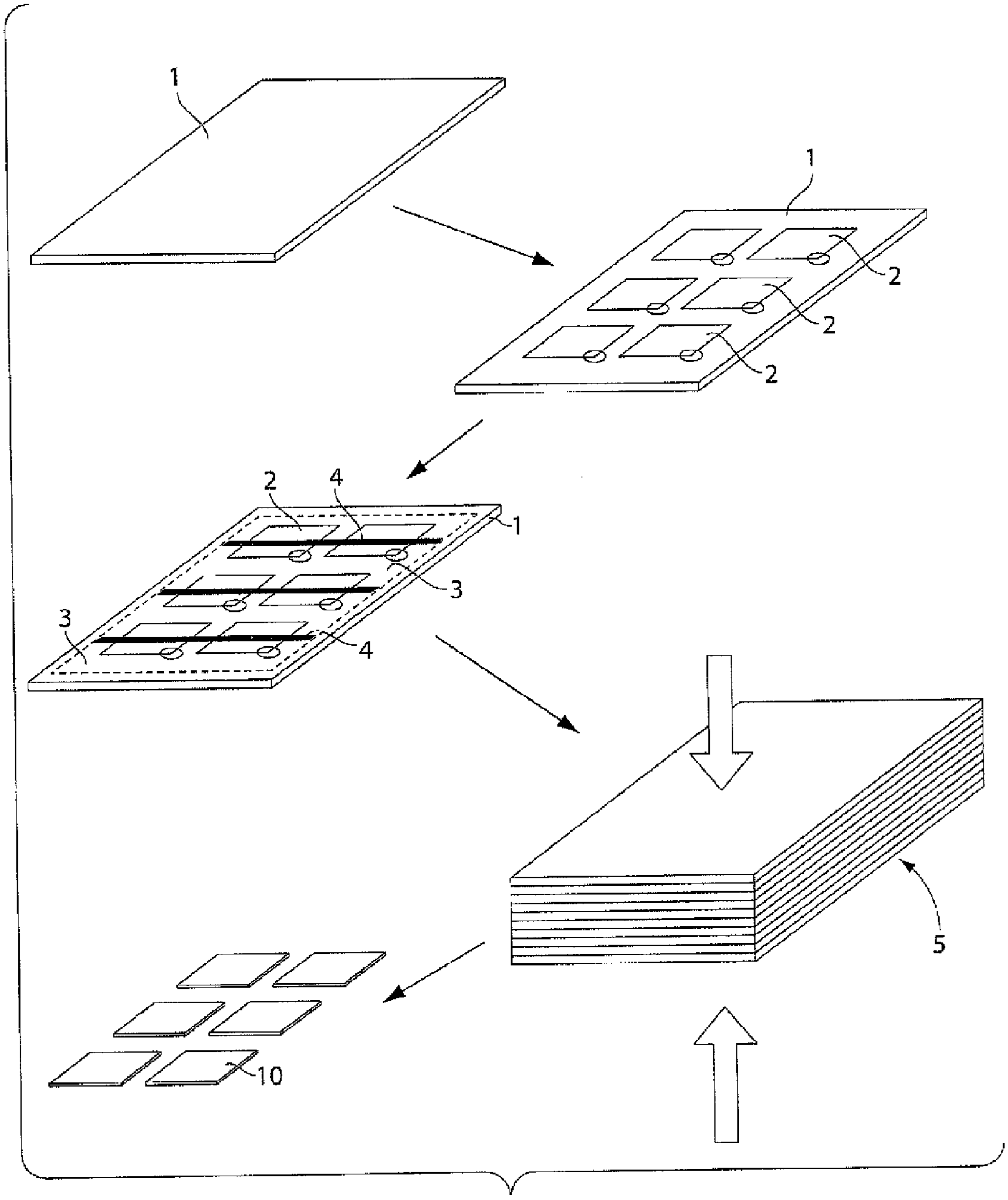
FIG. 1 shows a schematic diagram of a manufacturing process for forming transaction cards in accordance with aspects of the invention.

It should be understood that aspects of the invention are described with reference to the figures which show illustrative embodiments of the invention. The illustrative embodiments described below are not intended to show all aspects of the invention, but rather are used to describe a few illustrative embodiments of the invention. Thus, aspects of the invention are not intended to be construed narrowly in view of the illustrative embodiments.

As discussed above, transaction cards are widely used for a variety of different purposes, such as for credit and debit account purchases, tracking member activity (e.g., tracking frequent flyer activity), for gift-certificate purchases, opening hotel room doors, and so on. In one aspect of the invention, a transaction card and method for forming such a card is provided in which the card includes a substantial amount of PLA, yet is made to be compliant with ISO specifications for transaction cards. In addition, a transaction card and method for forming such a card is provided with a non-laminated outer surface having a glossy or otherwise smooth surface. The outer surface may be highly durable and resistant to scratching, abrasion, peeling or other damage to the card. The outer surface may be formed by applying a liquid coating material to card substrate, e.g., over a printed graphic or other image information, and subsequently subjecting the card substrate and the coating material to heat and pressure. Aspects of the invention may also be used in the manufacture of other sheet products, such as signs, point-of-sale displays, wallet-size or other calendars, rulers, etc., that are made using a process like that discussed below with respect to transaction cards. Thus, aspects of the invention should not necessarily be limited to transaction cards, but instead may be used with other products.

FIG. 1 shows a schematic diagram of an illustrative process for forming transaction cards (or other sheet products) in accordance with one aspect of the invention. Initially, a sheet of material 1 that serves as a substrate for one or more transaction cards is provided. The sheet of material may be made of, or include, any suitable material or combination of materials, such as polyvinyl chloride (PVC), polylactic acid (PLA), polyethylene terephthalate, (PET), polyethylene terephthalate copolymer (PETG), acrylonitrile butadiene (ABS), polystyrene (PS), polycarbonate, teslin, or any other paper- or polymer-based material. In a preferred embodiment, the sheet of material 1 includes a substantial amount of PLA, e.g., 80% or more PLA. The sheet of material 1 may have a solid construction (e.g., have a uniform material and density throughout its thickness), a laminated construction (e.g., a core material sandwiched between top and bottom sheets), or any other suitable arrangement. The sheet may have any suitable size and/or thickness for forming any number of transaction cards. In one embodiment, the sheet of material 1 may be arranged so that the ultimately fabricated transaction card(s) meet ANSI and ISO specifications for transaction cards, e.g., the sheet of material 1 may have a thickness so that the finished transaction cards have a thickness of 0.030 inches±ten percent.

The sheet of material 1 may have image information 2 formed on one or both sides of the sheet of material 1, e.g., by printing with one or more different color inks. (In some embodiments, no image information need be formed on the sheet of material 1 at this point in the process. Instead, the finished card may have image information formed over the liquid coating material (such as in the case of hospital identification cards or other security cards that are printed on demand), or have no image information at all.) The image information may be suitable for use with a transaction card and may take any form, e.g., graphics, logos, trademarks, alphanumeric text, photographic-like images, holograms, polarizing layers, security features (e.g., may not be visible under normal conditions, but made visible under special illumination or viewing conditions), and so on. The image information may be formed in any suitable way on the sheet of material 1, such as by printing (whether offset, inkjet, screen-print, etc.), lamination, deposition, or other suitable processes. The image information may be formed directly on the sheet of material 1, or on an intervening layer, such as a layer of adhesive or other material, that may be provided between the image forming material and the sheet, e.g., to help prevent color bleeding. (As used herein, forming image information "on" the sheet of material includes formation of the image information directly on the sheet as well as formation of image information on one or more layers positioned between the image information and the sheet of material.)

After formation of image information, a liquid coating material 3 may be applied to at least a portion of one side of the sheet of material 1. (As with the formation of image information, applying the liquid coating material to or on the sheet of material includes applying the material so that it is in direct contact with the sheet of material and/or so that there is one or more intervening layers, such as an image layer positioned between the liquid coating and the sheet of material.) The liquid coating material 3 may be applied in any suitable way, such as by spray, roll coating, offset printing, meyer rod, etc. Any suitable liquid coating material 3 may be used and may be applied to any suitable thickness. In one preferred embodiment, the liquid coating material 3 is a UV clear coat varnish (e.g., product #CU-2038HG-24 supplied by Cork Industries, Inc. of Folcroft, Pa.) and is applied via an Anolox doctor blade coater to a thickness of about 2.5 microns. (The #CU-2038HG-24 product has a viscosity of about 360-400 cpc, a cure rate of about 150 fpm/300 w, a rub resistance of about +200 rubs/4 lbs-wt., and a gloss @ 60 degrees of 90+ (pre-lamination). The #CU-2038HG-24 product contains the following components in respective percent quantities by weight: trimethylolpropane triacrylate 15-23%; tripropylene glycol diacrylate 4-7%; 1,6-hexanediol diacrylate 5-10%; acrylate ester of bisphenol epoxy 28-33%; and reactive tertiary amine 6-9%.) The liquid coating material 3 is preferably transparent, but may be translucent or opaque. A uniform layer of liquid coating material 3 may be applied across an entire side of the sheet, or selected portions of the sheet (so called "knock-out" areas) may be left free of the liquid coating material 3. For example, and as shown in FIG. 1, the liquid coating material 3 may be applied to areas other than selected portions where an optional magnetic strip material 4 is to be applied. Before or after application of the liquid coating material 3, the magnetic strip material 4 may be applied to the selected portions of the sheet 1. By applying the magnetic strip material 4 to areas where the liquid coating material 3 is not applied, adhesion of the strip material 4 may be enhanced and/or a better surface finish for the card may be provided (e.g., the top surface of the magnetic strip 4 may lie flush with the top surface of the liquid coating material 4 after heat and pressure is subsequently applied during a lamination process.) The liquid coating material 3 may not be applied to areas of the sheet 1 for other reasons as well.

After the liquid coating material 3 is applied to the sheet 1, the liquid coating material may be dried or cured, e.g., by exposure to ultraviolet (UV) light in the case of a UV-curable coating material or exposure to other suitable conditions in the case of other types of liquid coating materials. The sheet 1 may then be subjected to heat and pressure (optionally along with a plurality of other sheets 1) to form the desired surface finish and dimensions for the transaction cards. Heat and pressure may be applied in any suitable way, such as using a lamination press typically used to apply heat and pressure to sheets having an over-laminate film applied to one or both sides of the sheet. In one preferred embodiment, a stack 5 of 10-11 sheets are provided together in a lamination press and subjected (during a hot press cycle) to temperatures up to about 300 degrees F. and pressures of about 150 psi (at the press platen) for a period of about 17 minutes. Thereafter, the sheets may be subjected to a cold press cycle involving temperatures of about 60 degrees F. and a platen pressure of about 300 psi for about 16 minutes. Metal sheets or other separation members may be positioned between adjacent plastic sheets. It should be understood that the heat/pressure/time parameters may be varied as necessary to provide a desired surface finish or other characteristics for the transaction cards. In the preferred embodiment, gloss values for the surface finish after treatment in the lamination press were measured to be between about 80 and 93 with an average of about 85 using a Mallinckrodt 60 degree pocket gloss meter, catalog #4020. This compares favorably with gloss values for finished cards having a conventional PVC over-laminate, which measured in one sample between about 84 and 92, with an average of about 88. After lamination, one or more transaction cards 10 may be formed from the sheet 1, such as by die cutting the cards 10 from the sheet. The cards 10 may then be subjected to additional processing, if desired, such as printing or other image information forming, encoding, sorting, packaging, personalization and/or quality control operations, as is known in the art.

In accordance with an aspect of the invention, the sheet of material 1 used to make the transaction cards may contain a substantial amount of PLA, such as 80%, 90%, 95% or more. The inventors have found that improper processing of sheets containing substantial amounts of PLA will typically result in the formation of cards that do not meet all ANSI and ISO specifications for transaction cards. For example, if the sheets are not subjected to sufficient heat and pressure before cutting cards from the sheet, the cards will typically not pass ISO tests regarding extended exposure to elevated temperatures, such as exposure for 1 hour at 150 degrees F. That is, without subjecting the sheet to sufficient heat and pressure, cards that are cut from the sheet and then exposed to ISO-required conditions for extended high temperature/humidity conditions will shrink in size or warp (also known as "potato chipping") by an unacceptable amount, thereby rendering the card non-compliant with ISO specifications. In accordance with this aspect of the invention, transaction cards may be made from a sheet containing a substantial amount of PLA, yet meet ISO requirements for transaction cards. This is desirable since PLA can be made using so-called "green" manufacturing processes that use corn or another sugar-based material (such as beets, flax, sugar cane, soybeans, etc.) as raw material. This is in contrast to petroleum-based or natural gas-based materials such as PVC, which are generally made using a petroleum-based or natural gas-based product as a raw material.

In one embodiment, a sheet of material 1 including a substantial amount of PLA may be processed as described above with respect to FIG. 1 in such a manner so as to render transaction cards formed from the sheet 1 are ISO-compliant. In a preferred embodiment, a sheet of material with image information and a liquid coating layer may be subjected to heat and pressure such that transaction cards (or other sheet products) formed from the sheet meet ANSI and ISO specifications for transaction cards. In one illustrative embodiment, the sheet may be subjected (e.g., during the hot press cycle discussed above) to temperatures of about 250 degrees F. to about 350 degrees F. and pressures of about 150 psi (at the press platen) for a time of about 15 minutes in a laminating press. The hot press cycle may be followed by a cold press cycle, such as that described above. Also, it should be understood that the specific temperature, pressure and hold times described above (e.g., 250-350 F/150 psi/15 mins) may be varied in any suitable way. For example, in some embodiments, the temperature used may exceed 350 F, the pressure may be less than 150 psi and the hold time may be adjusted to be less than 15 mins. Other variations will occur to those skilled in the art.

In accordance with this embodiment, transaction cards may be made using a sheet of material that contains a substantial amount of PLA, and may be provided with a smooth outer surface formed using a liquid coating material instead of an over-laminate film as discussed above. Since most, if not all, over-laminate films are made of a petroleum-based or natural gas-based material, such as PVC, PET, PETG, polycarbonate and others, transaction cards may be made using a higher percentage amount of "green" (or more environmentally-friendly) material than previously possible. Moreover, the cards may be made so as to have a high quality surface finish and otherwise meet all ISO specifications for transaction cards. (Although transaction cards in this illustrative embodiment are made using a liquid coating material, in some embodiments the liquid coating material may be replaced with an over-laminate film. In some embodiments, the overlaminate film may be made of a PLA or any other suitable material that is formed from a sugar-derived polymer.)

The transaction cards formed in accordance with aspects of the invention may have any suitable arrangement, such as a common CR-80 format, or have two or more separable parts like that described in U.S. Pat. No. 6,588,658, which is incorporated herein by reference. As also described in U.S. Pat. No. 6,588,658, the cards may be made to meet ANSI and ISO specifications for transaction cards after various card portions are separated from each other without the use of tools. Other features of the transaction cards (and optional auxiliary portions) described in U.S. Pat. No. 6,588,658 may also be used with transaction cards in accordance with aspects of the invention.

For example, the transaction cards 10 may include machine readable features, such as an encoded magnetic strip, a bar code, an embossing, radio frequency identification (RFID) chip or other passive device. These machine readable features may be formed in any suitable way, such as in a "personalization" process by which a magnetic strip is encoded with a unique identifier, a unique bar code is printed on the cards, a unique string of alphanumeric text is printed on the card (e.g., by inkjet printing, thermal printing, embossing, etc.), and so on. The transaction card 10 may also include more active devices, such as an active radio frequency identification (RFID) chip or other semiconductor device, such as those found in electronic cash cards or "smartcards" like that described in U.S. Pat. No. 5,971,282. Thus, the transaction card 10 may include any suitable electronic device capable of providing identification information, receiving and processing information or performing other desired transaction functions. The machine readable features may be used to store, obtain, transmit or otherwise handle any type of information, such as text, biometrics information (such as eyescan or fingerprint information) and so on. Such machine readable features, active devices, electronic devices, etc., may be provided at any point in the card manufacturing process, e.g., may be incorporated into the sheet of material 1 before image information is formed, formed on individual cards after the cards are cut from the sheet of material 1 (such as part of a "personalization" process), formed during the image formation process, and so on.

Although the embodiments described above relate to the formation of a magnetic strip using lamination process, magnetic strips may be formed on the transaction cards in any suitable way, such as by a roll-on, adhesive process and/or in a full magnetic back arrangement.

While aspects of the invention have been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. A method for forming a transaction card, comprising:

providing a sheet of material including at least 80% PLA;

forming a printed image on at least a portion of one side of the sheet of material, the printed image being suitable for use with a transaction card formed from the sheet of material; and subjecting the sheet of material with the printed image to heat and pressure suitable to enable a transaction card cut from the sheet of material to meet ISO requirements for thickness and dimensional stability regarding heat and humidity exposure.

2. The method of claim 1, wherein the sheet of material includes at least 90% PLA.

3. The method of claim 1, wherein the sheet of material includes at least 95% PLA.

4. The method of claim 1, wherein the PLA is derived from corn, flax, beets, sugar cane, soybeans or other sugar-based source.

5. The method of claim 1, further comprising:

applying a layer of liquid coating material to at least one side of the sheet of material prior to the subjecting step.

6. The method of claim 5, wherein the liquid coating material is a curable material, the method further comprising:

exposing the layer of liquid coating material to suitable conditions to cure the liquid coating material, the suitable conditions including UV light, heat, infrared light, air, or radio frequency energy.

7. The method of claim 5, wherein the step of applying comprises roll coating the liquid coating material onto at least one side of the sheet of material.

8. The method of claim 5, further comprising applying a magnetic strip material to selected portion of the sheet of material; and wherein the step of applying comprises applying the liquid coating material to all of the at least one side except for the selected portions of the sheet of material.

9. The method of claim 1, wherein the step of subjecting comprises heating and pressing the sheet of material with the printed image in a laminating press.

10. The method of claim 9, wherein the sheet of material is heated to a temperature of between approximately 250 degrees F. and 350 degrees F.

11. The method of claim 9, wherein the sheet of material is subjected to a pressure of approximately 150 psi.

12. The method of claim 9, wherein the step of subjecting comprises heating and pressing the sheet of material and the printed image in a laminating press with a plurality of other sheets of material.

13. The method of claim 1, further comprising:

cutting a plurality of individual transaction cards from the sheet of material.

14. The method of claim 1, wherein the step of subjecting comprises a hot press cycle and a cold press cycle, the hot press cycle including heating and pressing the sheet of material with the layer of liquid coating material at a temperature of between approximately 250 to 350 degrees F. and a pressure of approximately 150 psi, and the cold press cycle including heating and pressing the sheet of material with the layer of liquid coating material at a temperature of approximately 60 degrees F. and a pressure of approximately 300 psi.

15. The method of claim 1, further comprising coating the portion of one side of the sheet of material with an intervening layer before forming a printed image on at least the portion of one side of the sheet of material.

16. A transaction card comprising:

a sheet of material including at least 80% PLA; and an image printed on at least a portion of one side of the sheet of material;

wherein the sheet of material with the printed image is subjected to heat and pressure suitable to enable the transaction card to meet ISO requirements for thickness and dimensional stability regarding heat and humidity exposure.

17. The transaction card of claim 16, wherein the sheet of material includes at least about 90% PLA.

18. The transaction card of claim 16, wherein the sheet of material includes at least 95% PLA.

19. The transaction card of claim 16, wherein the PLA is derived from a sugar-based source.

20. The transaction card of claim 16, further comprising a coating layer formed over the image on at least one side of the sheet of material.

21. The transaction card of claim 20, wherein the coating layer is formed by applying a layer of liquid coating material to at least one side of the sheet of material, and subjecting the sheet of material with the liquid coating material and printed image to heat and pressure suitable to cause the liquid coating material to form a smooth exposed layer on the sheet of material.

22. The transaction card of claim 20, wherein the liquid coating material is a UV curable material.

23. The transaction card of claim 20, further comprising an intervening layer, wherein the image printed on at least the portion of one side of the sheet of material is printed on the intervening layer.

24. The transaction card of claim 16, further comprising a magnetic strip formed on the sheet of material.

25. A method for forming a transaction card, comprising:

providing a sheet of material including at least 80% PLA;

forming a printed image on at least a portion of one side of the sheet of material, the printed image being suitable for use with a transaction card formed from the sheet of material; and subjecting the sheet of material with the printed image to a temperature of between approximately 250 degrees F. and 350 degrees F. while subjecting the material to a pressure of approximately 150 psi thereby enabling a transaction card cut of the sheet of material to meet ISO requirements for thickness and dimensional stability regarding heat and humidity exposure.

* * * * *

UNITED STATES PATENT AND TRADEMARK OFFICE

CERTIFICATE OF CORRECTION

PATENT NO. : 7,461,791 B2
APPLICATION NO. : 11/347090
DATED : December 9, 2008
INVENTOR(S) : Robert Alan Keshura It is certified that error appears in the above-identified patent and that said Letters Patent is hereby corrected as shown below:

Col. 3, line 45, "inches±ten" should read -- inches ± ten --

Claim 20, Col. 8, line 27, "farther" should read -- further --

Signed and Sealed this

Tenth Day of February, 2009

JOHN DOLL
*Acting Director of the United States Patent and Trademark Office*